United States Patent [19]

McCullough

[11] 4,065,279

[45] Dec. 27, 1977

[54] SCROLL-TYPE APPARATUS WITH HYDRODYNAMIC THRUST BEARING

[75] Inventor: John E. McCullough, Carlisle, Mass.

[73] Assignee: Arthur D. Little, Inc., Cambridge, Mass.

[21] Appl. No.: 722,695

[22] Filed: Sept. 13, 1976

[51] Int. Cl.² .................. F25B 1/04; F16C 17/04; F01C 1/02; F04C 17/02
[52] U.S. Cl. .................................. 62/510; 418/55; 308/9
[58] Field of Search ............... 418/55, 57, 97–100; 308/9; 62/510

[56] References Cited

U.S. PATENT DOCUMENTS

| 846,795 | 3/1907 | Kruesi | 308/9 |
|---|---|---|---|
| 1,083,838 | 1/1914 | Key | 308/9 |
| 3,994,633 | 11/1976 | Shaffer | 418/55 |

FOREIGN PATENT DOCUMENTS

| 707,807 | 4/1931 | France | 418/55 |
|---|---|---|---|
| 1,525,479 | 3/1969 | Germany | 308/9 |
| 19,842 | 2/1966 | Japan | 308/9 |

Primary Examiner—John J. Vrablik
Attorney, Agent, or Firm—Bessie A. Lepper

[57] ABSTRACT

A flat plate hydrodynamic thrust bearing for orbiting machinery and scroll-type apparatus embodying the thrust bearing are disclosed. The thrust bearing exerts an axial force on the orbiting scroll member to ensure efficient radial sealing of the scroll assembly; and one of the contacting surfaces of the bearing and or of the orbiting scroll member, serving as a journal, has a plurality of intersecting groovings to ensure continuous lubrication of the surfaces. The scroll apparatus is particularly suited for incorporation in a closed cycle refrigeration system wherein minimum wear over extended periods and quiet and reliable operation are required.

25 Claims, 18 Drawing Figures

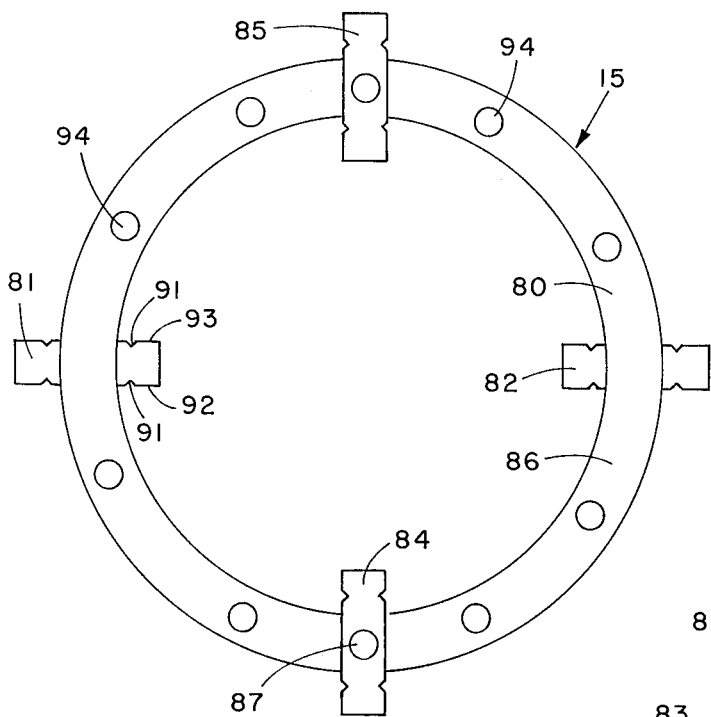
Fig.12
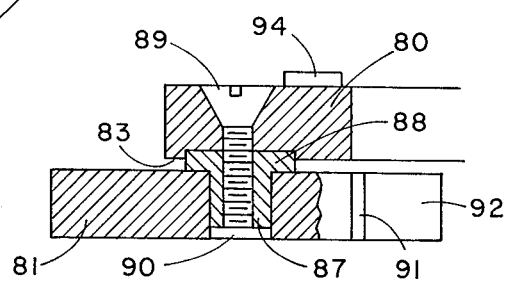
Fig.11
Fig.13
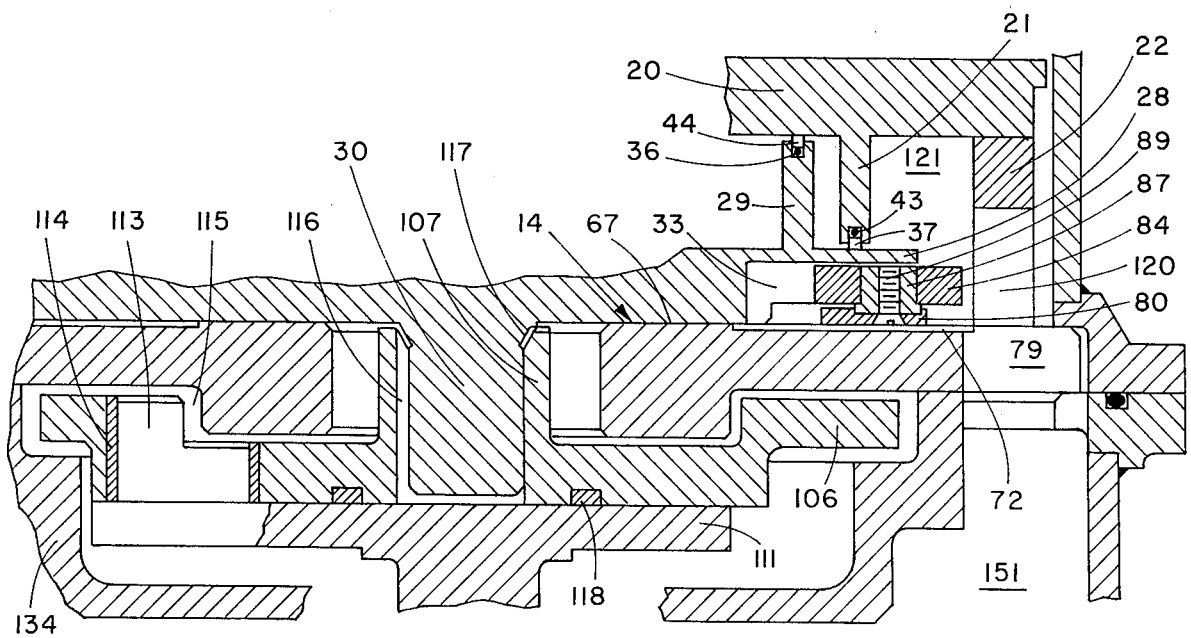
Fig.15

SCROLL-TYPE APPARATUS WITH HYDRODYNAMIC THRUST BEARING

This invention relates to scroll-type apparatus and more particularly to scroll-type apparatus which incorporate hydrodynamic thrust bearings and which are particularly suitable as refrigerant compressors for low-cost, long-life, reliable operation.

There is known in the art a class of devices generally referred to as "scroll" pumps, compressors and engines wherein two interfitting spiroidal or involute spiral elements of like pitch are mounted on separate end plates. These spiral elements are angularly and radially offset to contact one another along at least one pair of line contacts such as between spiral curved surfaces. A pair of line contacts will lie approximately upon one radius drawn outwardly from the central region of the scrolls. The fluid volume so formed therefore extends all the way around the central region of the scrolls. In certain special cases the pocket of fluid volume will not extend the full 360° but because of special porting arrangements will subtend a smaller angle about the central region of the scrolls. The pockets define fluid volumes, the angular position of which varies with relative orbiting of the spiral centers; and all pockets maintain the same relative angular position. As the contact lines shift along the scroll surfaces, the pockets thus formed experience a change in volume. The resulting zones of lowest and highest pressures are connected to fluid ports.

An early patent to Creux (U.S. Pat. No. 801,182) describes this general type of device. Among subsequent patents which have disclosed scroll compressors and pumps are U.S. Pat. Nos. 1,376,291, 2,475,247, 2,494,100, 2,809,779, 2,841,089, 3,560,119, 3,600,114, 3,802,809 and 3,817,664 and British patent Specification No. 486,192.

Although the concept of a scroll-type apparatus has been known for some time and has been recognized as having some distinct advantages, the scroll-type apparatus of the prior art, as represented, for example, in the above-cited patents, has not been commercially successful, primarily because of sealing and wearing problems which have placed severe limitations on the efficiencies, operating life, and pressure ratios attainable. Such sealing and wearing problems are of both radial and tangential types. Thus effective axial contacting must be realized between the ends of the involute spiral elements and the end plate surfaces of the scroll members which they contact to seal against radial leakage and achieve effective radial sealing; and effective radial contacting with minimum wear must be attained along the moving line contacts made between the involute spiral elements to seal against tangential leakage.

Recently, however, the problems associated with sealing and wear have been minimized to the extent that scroll-type apparatus are able to compete in efficiency with other types of compressors, expansion engines and pumps. Solutions to these problems are embodied in the novel apparatus described in U.S. Pat. Nos. 3,874,827, 3,884,599 and 3,924,977 and in U.S. Ser. Nos. 561,478, 561,479, 570,170 and 627,854, all of which are assigned to the same assignee as this present invention. These solutions include providing means to counteract at least a portion of the centrifugal forces acting on the orbiting scroll member and to control tangential sealing forces along line contacts between the involute wraps of the scroll members; axial compliance/sealing means to insure efficient radial sealing between the involute wrap ends and the surfaces of the scroll member end plates; novel means for developing axial forces to continually urge the scroll members into contact to maintain radial sealing; and means to cool both orbiting and stationary scroll members.

As a result of the provision of these solutions to the basic scroll-type apparatus construction problems, there has now developed a demand for scroll-type apparatus for a wide range of uses, including refrigerant compressors which must be capable of reliable performance for an extended period of time without maintenance.

Compressors for refrigerants, and particularly compressors for small household refrigerators, must be capable of reliable, quiet, maintenance-free operation for extended periods of time. Typically, such compressors in their operation have inlet pressures of about 80 psia and outlet pressures of about 300 psia. This means that there are always present within any scroll-type compressor used for such applications gas forces which act in an axial direction to exert forces tending to separate the scroll members. This in turn gives rise to radial leakage from fluid pocket to pocket. This condition, in turn, requires appropriate axial force applying means capable of maintaining the required contact between the wraps and end plates of the oribiting and stationary scroll members. Such axial force applying means must be capable of effecting radial sealing over extended periods of time without causing undue wear between the moving contacting surfaces and without recourse to periodic adjustment or maintenance.

The prior art teaches a number of approaches to the attainment of radial sealing. One such approach is the machining of the components (wraps and end plates) to accurate shapes for fitting with very small tolerances to maintain radial sealing gaps sufficiently low to achieve useful pressure ratios. This is difficult and very expensive to accomplish. In other prior art devices, radial sealing has been achieved through the use of one or more mechanical axial constraints, e.g., bolts to force the surfaces into contact (U.S. Pat. No. 3,011,694) requiring precise adjustment to attain radial sealing without undue wearing. If during extended operation of such devices, such as encountered in a refrigerator compressor, this adjustment is disarranged by one component experiencing more wear, or by any other mechanism, the problem of wear of other components may grow progressively worse until satisfactory radial sealing is no longer obtained.

Since the use of surfaces machined to close tolerances or the use of mechanical constraints such as bolts to force axial contacts are not suitable techniques for achieving radial sealing in commercially produced scroll apparatus, more recent techniques for achieving effective radial sealing have included the use of a compliant fixed scroll member (U.S. Pat. No. 3,874,827) or the use of a pressurized fluid (with or without springs to provide an augmenting axial force) to urge the scroll members into axial contact.

In the use of pressurized fluid (generally in combination with some form of mechanical spring) to achieve radial sealing, the fluid under pressure is used to axially urge the orbiting scroll member in contact with the fixed scroll member. This fluid may be drawn from one of the moving fluid pockets defined within the apparatus (U.S. Pat. Nos. 3,600,114, 3,817,664 and 3,884,599) or from an external source (U.S. Pat. No. 3,924,977).

In application Ser. No. 561,478, now U.S. Pat. No. 3,994,633, assigned to the same assignee as this application, there is disclosed an improved radial sealing means particularly suited for larger scroll-type compressors or expanders operating at high pressures. In the scroll-type apparatus using these improved radial sealing means all of the forces required to achieve efficient axial load carrying are pneumatic forces provided by pressurizing all or a selected portion of the apparatus housing. Thus the housing defines with a surface of the orbiting scroll member a pressurizable chamber whereby the fluid pressure within that chamber forces the orbiting scroll into continued axial contact relationship with the fixed scroll member.

Finally, U.S. Ser. No. 561,479, now U.S. Pat. No. 3,994,636, also assigned to the same assignee, discloses the incorporation of so-called axial compliance/sealing means which are provided to maintain continuous radial sealing of the involute wrap member surfaces and the end plate surfaces. These axial compliance/sealing means are preferably used in conjunction with means which provide some axial forces to urge these surfaces in contact. Thus, they are particularly suitable for use with the radial sealing means described in the above identified U.S. Pat. Nos. 3,884,599, 3,874,827 and 3,924,977. These axial compliance/sealing means comprise seal elements generally shaped to have the same configuration as the wrap members with which they are used and means to actuate the seal elements by urging them into contact, with a predetermined preload, with the opposing scroll member and plate. The means to actuate the seal element to make axial sealing contact may be pneumatic, mechanical or a combination of pneumatic and mechanical.

In the case of compressors for refrigerators, particularly for household refrigeration systems, the combined requirements of being able to handle large axial forces, low manufacturing cost, long life with minimum maintenance, and reliable and quiet operation can not satisfactorily be met by any one alone of the above-described means for achieving axial sealing. Since the problems presented by scroll machinery capable of meeting these requirements are different from those presented, for example, by rotary machinery, it becomes necessary to provide novel means for axially supporting the orbiting scroll of refrigerant compressors to insure continuous, reliable axial sealing.

It is therefore a primary object of this invention to provide novel, improved scroll-type apparatus particularly suitable for use as compressors for closed cycle refrigeration equipment. Another object is to provide apparatus of the character described which is capable of handling large axial forces in a manner to attain effective radial sealing. A further object is to provide scroll-type apparatus which may be made at relatively low cost, but which exhibits a long running life and is capable of reliable, quiet operation. Yet another primary object of this invention is to provide a unique and novel flat plate hydrodynamic thrust bearing for orbiting machinery. Still a further object is the providing of a new improved closed cycle refrigeration system.

Other objects of the invention will in part be obvious and will in part be apparent hereinafter.

The invention accordingly comprises the features of construction, combinations of elements, and arrangement of parts which will be exemplified in the constructions hereinafter set forth, and the scope of the invention will be indicated in the claims.

According to one aspect of this invention, there is provided a flat plate hydrodynamic thrust bearing with a first contacting surface for use with a journal member having a second contacting surface which is driven to define an orbiting motion, characterized in that one of the contacting surfaces has intersecting groovings for carrying an oil lubricant whereby the contacting journal and bearing surfaces are lubricated with a thin essentially continuous film of the oil lubricant.

According to another aspect of this invention, there is provided a positive fluid displacement apparatus into which fluid is introduced through an inlet port for circulation therethrough and subsequently withdrawn through a discharge port, and comprising a stationary scroll member having an end plate and an involute wrap and an orbiting scroll member having an end plate and an involute wrap affixed to the inner surface thereof, driving means for orbiting the orbiting scroll member with respect to the stationary scroll member whereby the involute wraps make moving line contacts to seal off and define at least one moving pocket of variable volume and zones of different fluid pressure on both sides of the moving line contact, coupling means to maintain the scroll members in fixed angular relationship, axial force-applying means for providing an axial force to urge the involute wrap of the stationary scroll member into axial contact with the end plate of the orbiting scroll member and the involute wrap of the orbiting scroll member into axial contact with the end plate of the stationary scroll member thereby to achieve radial sealing of the pockets, and tangentail sealing means for effecting tangential sealing along the moving line contacts, characterized in that flat plate hydrodynamic thrust bearing means serves as the axial force-applying means, the thrust bearing means having a bearing surface for force-applying engagement with at least a portion of the outer surface of the orbiting scroll member end plate which serves as a journal surface, either the bearing surface or the journal surface having intersecting groovings for carrying an oil lubricant whereby the bearing and journal surfaces are lubricated with a thin, essentially continuous film of the oil lubricant when the orbiting scroll member is orbited by the driving means.

According to yet another aspect of this invention, there is provided a closed cycle refrigeration system comprising the positive fluid displacement apparatus constructed as described serving as a compressor for a refrigerant, heat exchange means arranged to cool high-pressure fluid delivered from the compressor; fluid expansion means; a refrigeration load arranged to be cooled by the resulting cooled expanded fluid, and conduit means for conducting the fluid from the compressor, through the heat exchange means, the expansion means and the refrigeration load, and returning it as low pressure fluid to the compressor.

For a fuller understanding of the nature and objects of the invention, reference should be had to the following detailed description taken in connection with the accompanying drawings in which FIG. 1 is a longitudinal cross section of a compressor constructed according to this invention;

FIG. 11 is a plan view of another embodiment of the thrust bearing using polar-coordinated groovings;

FIG. 12 is a top plan view of the coupling means used in the apparatus of FIG. 1;

FIG. 13 is a cross section of a portion of the coupling means of FIG. 12 showing the construction and attachment of a coupling key;

FIG. 15 is a cross section of one side of the scroll assembly, thrust bearing, coupling means and swing-link assembly taken through a plane at 90° from that of FIG. 1;

The principles of the operation of scroll apparatus have been presented in previously issued patents. (See for example U.S. Pat. No. 3,884,599.) It is therefore unnecessary to repeat a detailed description of the operation of such apparatus. It is only necessary to point out that a scroll-type apparatus operates by moving a sealed pocket of fluid taken from one region into another region which may be at a different pressure. If the fluid is compressed while being moved from a lower to higher pressure region, the apparatus serves as a compressor; if the fluid is expanded while being moved from a higher to lower pressure region it serves as an expander; and if the fluid volume remains essentially constant independent of pressure then the apparatus serves as a pump.

Although the apparatus of this invention is suitable as a compressor, expander or pump, it is particularly suitable as a compressor wherein both the inlet and discharge pressures are considerably above atmosphere, for example 80 and 300 psia, respectively. The embodiment illustrated will be of such a compressor.

The sealed pocket of fluid within the scroll apparatus is bounded by two parallel planes defined by end plates, and by two cylindrical surfaces defined by the involute of a circle or other suitably curved configuration. The scroll members have parallel axes since in only this way can the continuous sealing contact between the plane surface of the scroll members be maintained. A sealed pocket moves between these parallel planes as the two lines of contact between the cylindrical surfaces move. The lines of contact move because one cylindrical element, e.g., a scroll member, moves over the other. This is accomplished, for example, by maintaining one scroll fixed and orbiting the other scroll.

Throughout the following description the term "scroll member" will be used to designate the component which is comprised of both the end plate and the elements which define the contacting surfaces making movable line contacts. The term "wrap" will be used to designate these elements making moving line contacts. These wraps have a configuration, e.g., an involute of a circle (involute spiral), arc of a circle, etc., and they have both height and thickness.

The particular embodiment chosen to illustrate the scroll apparatus incorporating the flat plate hydrodynamic thrust bearing of this invention is one which uses the driving means disclosed and claimed in U.S. Pat. Nos. 3,884,599 and 3,924,977, and the axial compliance/sealing means of U.S. Ser. No. 561,479.

Figure 1:
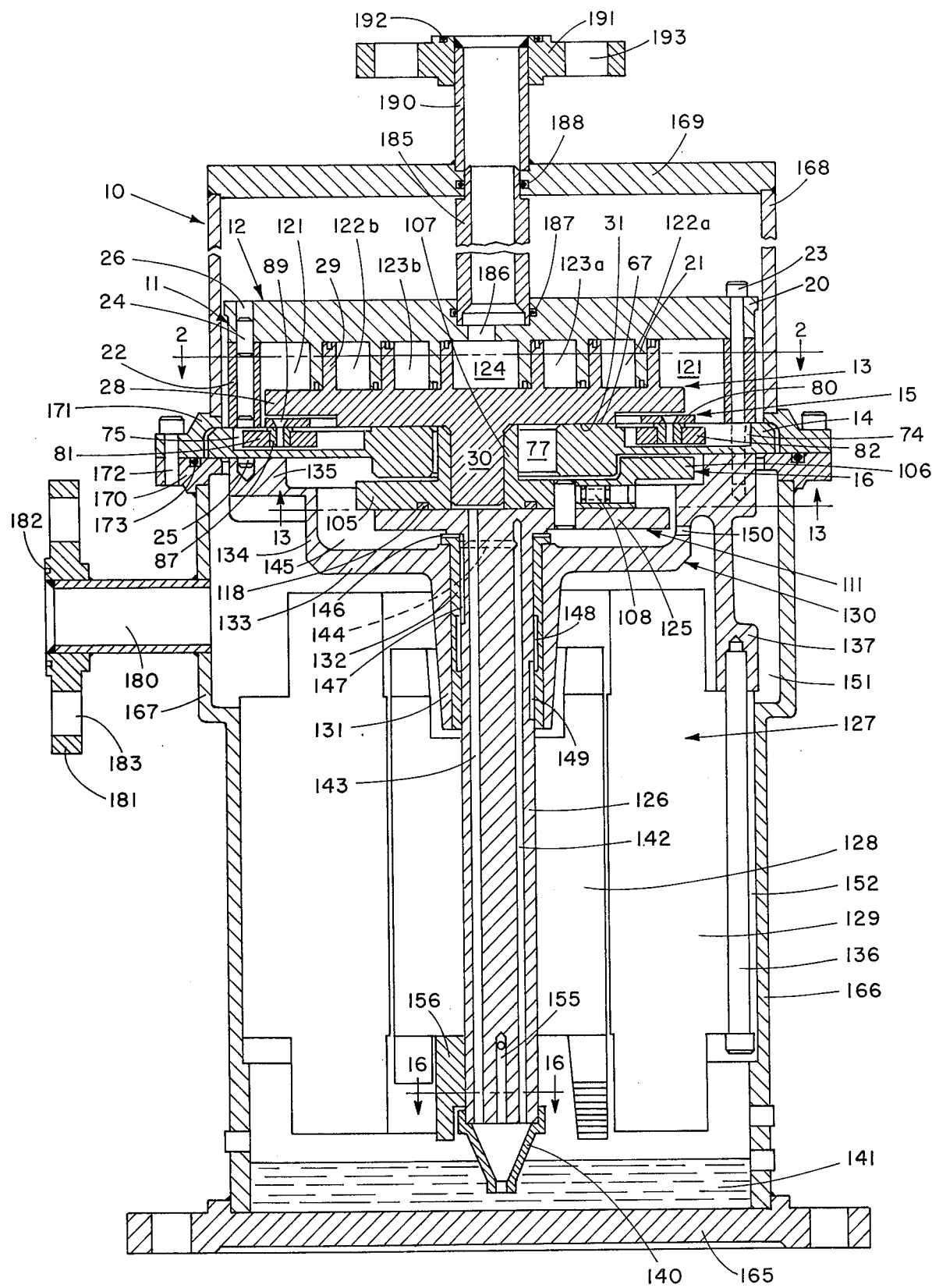

Scroll apparatus constructed in accordance with this invention is illustrated in FIG. 1 which is a longitudinal cross section of a compressor suitable for a closed cycle refrigeration system. The compressor and motor are completely enclosed within a housing assembly which is generally indicated by the reference numeral 10. The scroll apparatus 11 comprises a fixed or stationary scroll member 12, an orbiting scroll member 13, a thrust bearing assembly 14, a coupling means 15 and a swing-link driving assembly 16.

Figure 2:
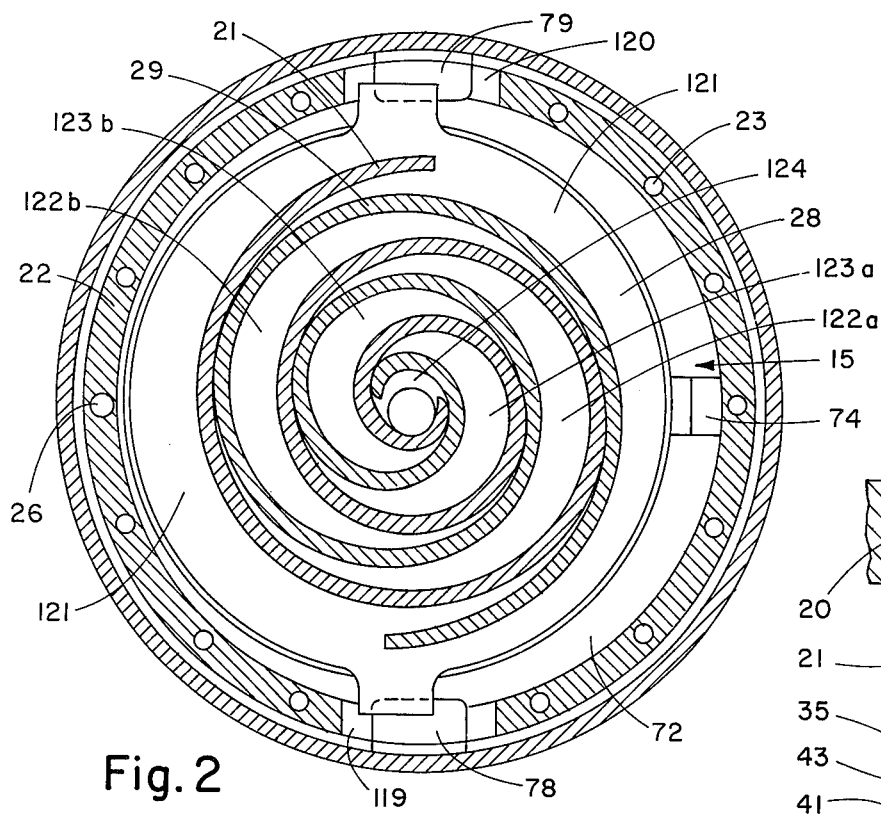
FIG. 2 is a cross section through the scroll assembly taken through plane 2—2 of FIG. 1.

The stationary scroll member 12 comprises an end plate 20 and spiral wraps 21 (see also FIG. 2); and it is rigidly mounted to the bearing assembly 14 through an annular ring 22 by means of a plurality of screws 23 and a pair of pins 24 and 25 in passage 26. These pins align the scroll members at final assembly. In FIG. 1, passage 26 is shown off line for convenience of illustration. (See FIGS. 8 and 9 which illustrate its precise location.) The orbiting scroll member 13 comprises an end plate 28, involute wraps 29 and a drive shaft 30 integral with end plate 28. End plate 28 of the orbiting scroll serves as the journal of the thrust bearing, and the bottom central surface 31 of end plate 28 is the journal surface contacting the thrust bearing. Two keyways 32 and 33 are cut in the bottom surface of the orbiting scroll for engagement with keys on the coupling means as described below. (See FIGS. 3 and 4.)

In the compressor of FIG. 1, sealing between the wraps of the stationary and orbiting scroll members and the end plates the contact is effected through the axial compliance/sealing means of Ser. No. 561,479 assigned to the same assignee, now U.S. Pat. No. 3,994,636. These axial compliance/sealing means are illustrated in detailed cross section in FIG. 5. The involute wrap 21 of stationary scroll member 12 has a channel 35 cut along essentially its entire length following the same involute configuration as the wrap. Likewise the involute wrap 29 of orbiting scroll member 13 has a channel 36 cut along essentially its entire length following its involute configuration. Seal elements 37 and 38, formed of either a metallic or nonmetallic material, are sized to fit in channels 35 and 36, respectively, to experience small excursions in both the axial and radial directions. The surfaces 39 and 40 of seal elements 37 and 38 are urged into sealing contact with surfaces 41 and 42 of end plates 28 and 20 by a force-applying means, illustrated in FIG. 5 as elastomeric o-ring cords 43 and 44.

These axial compliance/sealing means ensure the attainment of efficient radial sealing while minimizing wear of the contacting surfaces and permitting continual adjustments in the radial sealing. They also maintain the integrity of the tangential sealing of the moving line contacts between the wraps.

Figure 6:
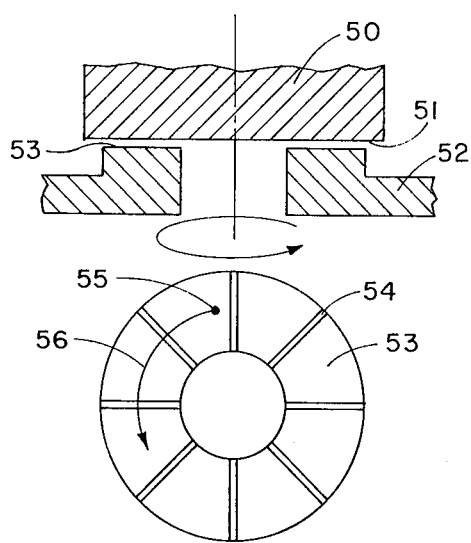
FIG. 6 is a diagrammatic representation of the surfaces involved in a thrust bearing used in rotating machinery.

Before describing the flat plate hydrodynamic thrust bearing of this invention, it will be helpful to describe and contrast the different situations encountered in rotating and orbiting machinery. This may be done with reference to FIGS. 6 and 7 which are somewhat diagrammatic representations of a rotating thrust bearing and an orbiting thrust bearing, respectively. In FIG. 6, the journal is represented as a shaft 50 with a contacting surface 51; and the bearing 52 is shown to have a bearing surface 53 having radial grooves 54 cut therein. When shaft 50 is rotated, any point, e.g., point 55, on shaft surface 51 will rotate in a circular path as indicated by arrow 56 and it will periodically receive a supply of oil from one of the oil grooves which are spaced to insure adequate lubrication of the rotating surface. This represents, in somewhat simplified form, a more-or-less conventional flat plate hydrodynamic thrust bearing suitable for intermediate or occasional operation of rotary apparatus at relatively light loads.

Figure 7:
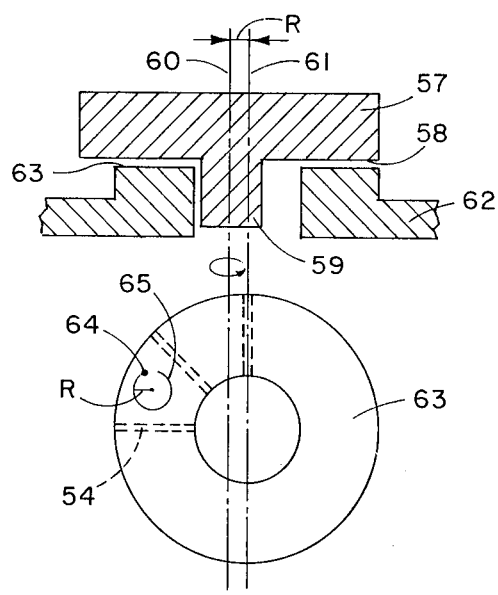
FIG. 7 is a diagrammatic representation of the surfaces involved in a thrust bearing used in orbiting machinery.

The situation which obtains in an orbiting apparatus is completely different as will be evident from FIG. 7. An orbiting scroll member 57 with a contacting surface 58 can be considered to be the journal which is orbited but not rotated about machine axis 61. The distance between axes 60 and 61 is, of course, the orbit radius R. The bearing 62 with bearing surface 63 is different from the configuration shown in FIG. 6. As will be seen from the top plan view of the bearing surface 63, if radial grooves 54 are cut into it, there is a large percentage of the contacting surface area, represented for example by moving point 64, which never comes into contact with a supply of lubricant since it never crosses a groove 54 in orbiting of the scroll member. This is due to the fact that the path of moving point 64 is a small circle as indicated by arrow 65. This is in direct contrast to going through a large circle as in the case of moving point 55. Moreover, the relative velocities between the bearing and the journal are different in orbiting and rotating machinery, being lower for the orbiting apparatus, i.e., being from about one-fourth to about one-tenth the velocity for rotating machinery. Finally, in scroll machinery for compressors in a refrigeration system, the orbital motion involves relatively high loads. It is therefore apparent that conventional thrust bearings can not be used in scroll apparatus.

Figure 9:
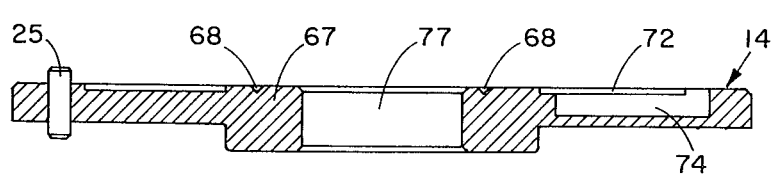
FIG. 9 is a cross section of the thrust bearing of FIG. 8 taken through plane 9—9 of FIG. 8.
Figure 10:
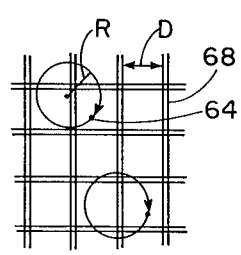
FIG. 10 is a diagram illustrating the relationship between the spacing of the orthogonal groovings of FIG. 8 and the orbit radius of the machinery incorporating the thrust bearing.

The thrust bearing of this invention is of a unique design to provide adequate lubrication for the orbiting mode of operation under conditions of continuous use and heavy loads. One embodiment of the thrust bearing 67 is shown in top plan view and cross section in FIGS. 8 and 9, respectively. In this embodiment the bearing surface 67 is enscribed with orthogonal groovings 68, these groovings being spaced such that any moving point in its orbiting will intersect or pass over at least four grooves as shown in the diagram of FIG. 10. This therefore defines the distance, D, between the groovings as greater than R but less than 2R, where R is the orbit radius. Although FIGS. 8 and 9 show the orthogonal groovings in the bearing surface, it is also within the scope of this invention to cut them instead in the journal surface, i.e., in bottom surface 31 of the orbiting scroll member.

Figure 8:
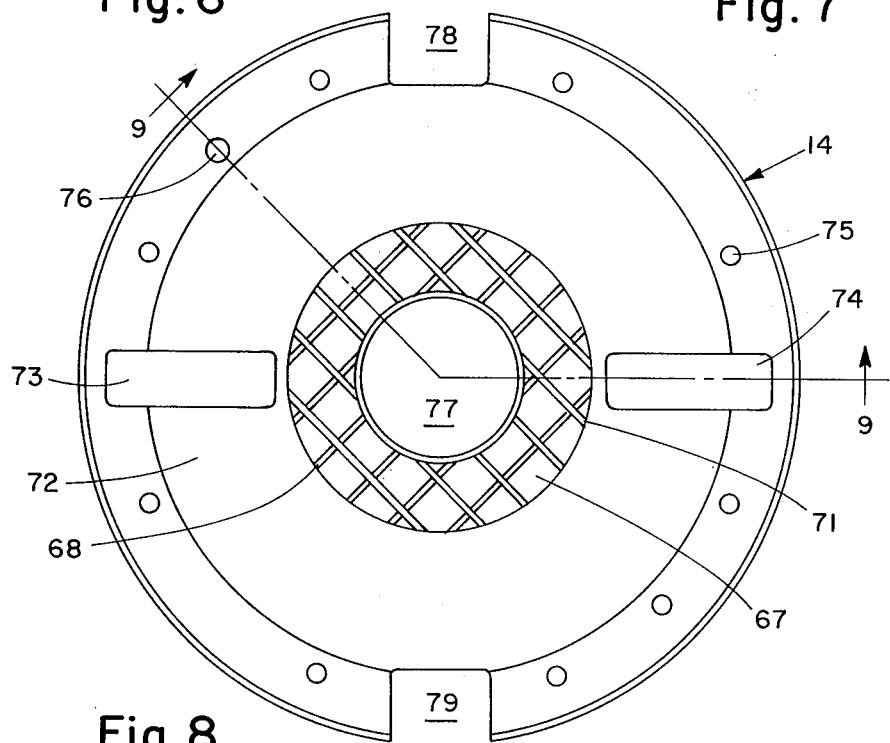
FIG. 8 is a top plan view of a flat plate hydrodynamic thrust bearing constructed in accordance with this invention incorporating orthogonal groovings as one embodiment of the intersecting groovings.

It is, of course, possible to use intersecting grooving patterns other than the orthogonal pattern illustrated in FIGS. 8 and 10, so long as the grooving pattern meets the requirement that any moving point in its orbiting will intersect or pass over at least four grooves. Exemplary of another grooving pattern is that shown in FIG. 11 wherein the pattern may be defined as a polar pattern. This polar pattern is formed of a plurality of uniformly spaced grooves 69 and a plurality of intersecting concentric circular grooves 70.

The upper surface of plate 14, in addition to bearing surface 67, has a shallow annular recessed lubricant supply channel 72 and oppositely disposed keyways 73 and 74 for engagement with keys of the coupling means as described below. A plurality of peripheral holes 75 are drilled through the bearing to accommodate screws 23 (FIG. 1) used to hold the scroll assembly together, and a hole 76 is drilled to be aligned with passage 26 to allow insertion of pin 25 (FIG. 1). The bearing assembly also has a central opening 77 of a size to accommodate the orbiting motion of orbiting scroll member drive shaft 30 and its mounting means described below. Finally, the bearing assembly has two oppositely disposed peripheral cut-outs 78 and 79 defining vertical gas inlet ports.

The use of the orthogonal groovings 68 (or other suitable grooving patterns) in bearing contacting surface 67 spaced at the required distance ensures that the entire areas of contacting surfaces 31 of the orbiting scroll member 13 and 67 of the bearing are continuously and adequately lubricated with an essentially continuous thin film of lubricating oil as the orbiting scroll member is driven to orbit the stationary scroll member 12 while being forced into sealing contact therewith through the axial force applied through the axial force-applying flat plate hydrodynamic thrust bearing 67. Thus efficient radial sealing is ensured over an extended period of operation; and the scroll apparatus runs quietly. Moreover, the orbiting scroll is cooled by virtue of the fact that its metal surfaces are being contacted through a very thin film of oil circulated by means described below.

In the operation of scroll apparatus, it is necessary to maintain the stationary and orbiting scroll members in a predetermined fixed angular relationship. In the compressor illustrated in FIG. 1, this is done by positioning the coupling member 15 between the orbiting scroll member and the thrust bearing assembly thus, in effect, coupling the stationary scroll member to the orbiting scroll member through the thrust bearing and the housing assembly. For such an application as a refrigeration compressor, it is of course necessary that the coupling member also be capable of operating over an extended period of time without experiencing undue wear. In a copending application Ser. No. 722,713 filed concurrently herewith I have described and claimed a unique coupling member which exhibits the desired wear characteristics, and that coupling member is shown incorporated in the apparatus of this invention. FIGS. 12 and 13 illustrate this coupling in top plan view and in a fragmentary cross sectional detail, respectively.

Figure 3:
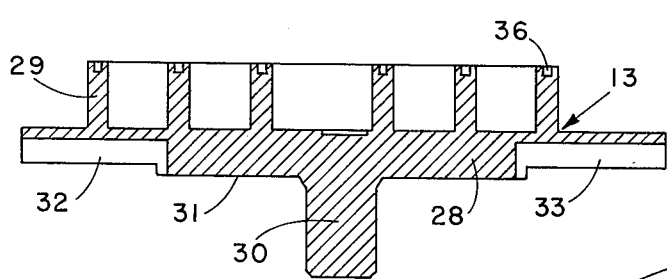
FIG. 3 is a longitudinal cross section of the orbiting scroll member.
Figure 4:
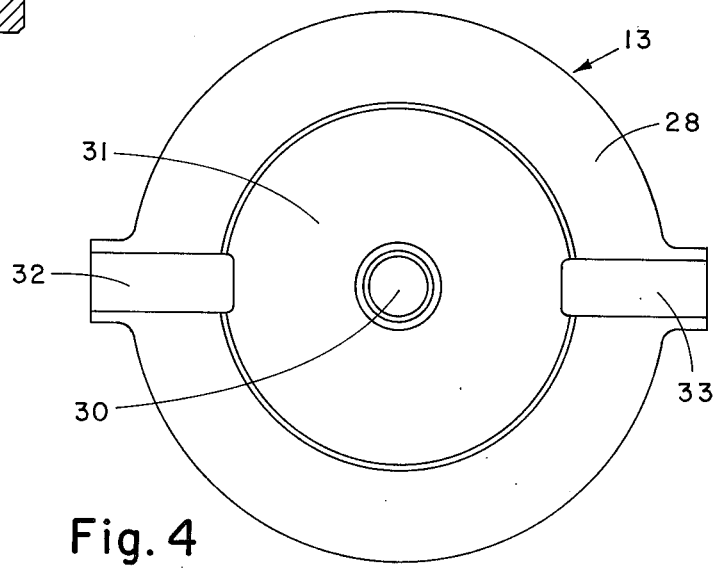
FIG. 4 is a plan view of the bottom of the orbiting scroll member showing keyways for the coupling means.

Coupling member 15 comprises an annular ring 80 which may be formed of a relatively light weight alloy with two keys 81 and 82 oppositely disposed on the bottom side 83 of ring 80 and suitable for slidingly engaging keyways 73 and 74 of the thrust bearing (FIG. 8), and two keys 84 and 85 oppositely disposed on the top side 86 of ring 80 and suitable for slidingly engaging keyways 32 and 33 on the bottom surface of the end plate of the orbiting scroll member (FIGS. 3 and 4). Keys 81 and 82 are spaced 90° from keys 84 and 85. Each of the keys, which is formed of a self-lubricating material such as a polyimide or a polytetrafluoroethylene, is affixed to annular ring 80 through a pivot pin 87 (FIG. 13) formed, for example, of a hardened steel. Pivor pin 87 has a flange 88 which is inset into a counterbore in the surface of the annular ring and it is affixed to ring 80 through screw 89. The use of the flange and its being inset into ring 80 reduces contact stresses and carries the load into the coupling ring rather than into the screw. Each of the keys, e.g., key 81 of FIG. 13, has a central passage 90 drilled therethrough of a size to make a slip fit over pin 87. Each key is configured as a rectangular block and it has two spaced oil grooves 91 cut in the two larger side faces 92 and 93 and running parallel to the axis of central passage 90. The distance between the two grooves in any one key face should be less than twice the orbit radius of the scroll and is preferably greater than the orbit radius. Finally, both sides of the annular ring have a plurality of spaced, inset contact disks 94 formed of a self-lubricating material. This coupling means has been found to experience no undue wear over extended periods of operation and is particularly suitable for apparatus such as illustrated in FIG. 1.

Figure 14:
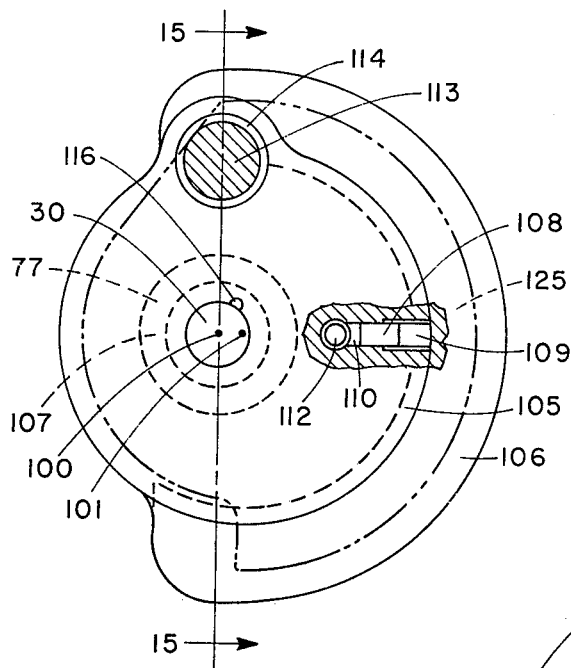
FIG. 14 is a plan view of the swing-link drive assembly used in the apparatus of FIG. 1.

The driving mechanism for the orbiting scroll member includes means to provide a centripetal radial force to oppose a fraction of the centrifugal force acting upon the orbiting scroll member. In accordance with the teaching of U.S. Pat. No. 3,924,977, this driving means used in apparatus illustrated in FIG. 1 incorporates radially compliant mechanical linking means, embodied in a swing-link, to provide the required centripetal forces. The driving means for the orbiting scroll member are illustrated in FIGS. 14 and 15, FIG. 14 being taken through plane 14—14 of FIG. 1 and FIG. 15 being taken through plane 15—15 of FIG. 14. Thus FIG. 15 provides, in addition to a cross section of the swing-link driving mechanism, a cross section of the apparatus of FIG. 1 taken at an angle of 90° from that of FIG. 1 and shows the bearing assembly, the coupling means, and the orbiting scroll member keyed into the coupling means.

As will be seen in FIGS. 1, 14 and 15, the driving means is affixed to the drive shaft 30 of the orbiting scroll member, the axis 100 of drive shaft 30 being parallel but spaced from the main machine axis 101 of the drive motor by a distance equal to the orbit radius. The swing link comprises a disk member 105, a counterweight 106 integral therewith, an eccentrically positioned bushing 107 for drive shaft 30, and a spring in compression 108 for providing the desired centripetal force. Spring 108 is adjusted by means of a flat point set screw 109 and bears upon spring plug 110. The swing link assembly is affixed to the motor crankshaft assembly 111 through pivot pin 112 and through crankshaft stud 113 which is set in bushing 114 and configured to give clearance 115 with the thrust bearing. Drive shaft bushing 107 has a vertical groove 116 to provide a lubricating oil passage and shaft 30 has a basal groove 117 for the same purpose. An o-ring 118 is used to seal the swing-link assembly to the crankshaft assembly 111. Finally, FIG. 15 shows a cutout 120 in annular ring 22 in communication with peripheral cutout 79 of the thrust bearing plate to provide a fluid inlet passage to the peripheral fluid inlet pocket 121 of the scroll apparatus. A similar arrangement is provided on the opposite side (not shown).

The crankshaft assembly 111, as shown in FIGS. 1 and 14, is comprised of an eccentrically-configured attachment plate 125 and shaft 126, which is the shaft of motor 127 comprising rotor 128 and stator 129. Within the main housing is motor housing assembly 130 which comprises a vertical section 131 holding bearing 132 for motor shaft 126, a horizontal cover section 133, a smaller annular ring section 134 enclosing plate 125 and a portion of the swing-link assembly and a larger, thickwalled annular ring section 136 providing the surface and base for attaching the scroll assembly through annular ring 22, screws 23 and pins 24 and 25. Motor 127 is affixed to motor housing assembly 130 by means of screw 136 which engages skirt 137 of the motor housing assembly.

Figure 5:
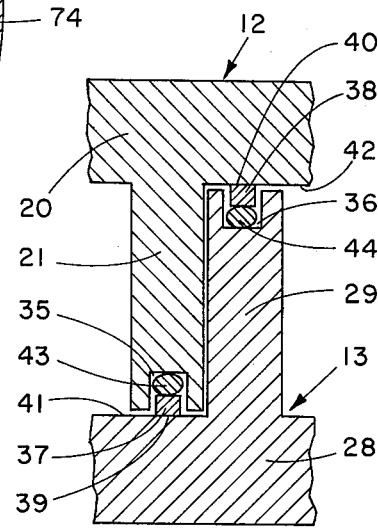
FIG. 5 is a fragmentary cross sectional detail of the involute wraps of the stationary and orbiting scroll members showing the axial compliance/sealing means used to obtain efficient radial sealing.

Shaft 126 terminates at its bottom end in an oil cup 140 which is immersed in an oil sump 141 contained within the main housing described below. Drilled into shaft 126 are parallel, balancing eccentric oil passages 142 and 143 opening into oil cup 140, passage 142 ending within attachment plate 125 and passage 143 extending the length of the crankshaft and opening into bushing 107 to communicate with bushing oil passage 116 (FIG. 15) and basal shaft passage 117. Passage 142 communicates through radial passage 144 which in turn communicates with the interior volume 145 of the motor housing assembly 130 through clearance 146. Passage 144 also communicates with a series of clearance passages 147, 148 and 149 to provide lubrication along the length of bearing 132. By virtue of the other clearances shown within the motor housing assembly, oil pumped up through passages 142, 143 and 144 by rotating cup 140 is forced as a lubricant into the orthogonal grooving 71 of the hydrodynamic thrust bearing (FIG. 8), through grooves 91 of the keys attached to the coupling member (FIG. 12), between shafts 30 and 126 and their respective bushings and between the seal elements 37 and 38 and their contacting end plates (FIG. 5). Circulation of the lubricating oil in this manner also serves to cool the various apparatus components. The lubricating oil is returned to sump 141 through apertures in the motor housing assembly such as aperture 150, and through fluid manifold 151 and narrow clearance 152 defined between motor stator 129 and the internal wall of the main housing.

Figure 16:
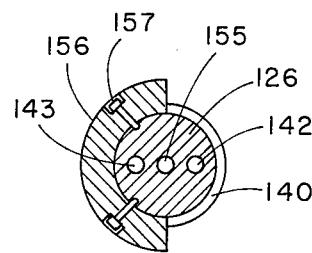
FIG. 16 is a cross section through the main drive shaft of the apparatus of FIG. 1.

Motor shaft 126 also has a short axial passage 155 for proper venting of the oil pumping element 140, and shaft 126 has attached to it at its lower end a counterweight 156 (FIGS. 1 and 16) by means of screws 157. This counterweight serves to counterbalance the swing-link attached to the crankshaft and to minimize vibration.

The main housing 10 is made up of a base plate 165 adapted for attachment to a support (not shown), a lower housing section 166 with a flared upper portion 167, an upper housing section 168 and a cover member 169. Lower housing section 166 has flange 170 welded to its upper flared portion 167, while upper housing section 168 has mating flange 171 welded to it. These flanges 170 and 171 provide the means for joining lower and upper sections 166 and 168 through a plurality of screws 172 using an o-ring seal 173 in a manner to support and affix the thrust bearing assembly to the housing.

The low pressure fluid to be compressed is introduced into peripheral scroll pockets 121 (FIGS. 2 and 15) through an inlet line 180 which leads into fluid manifold 151 defined within the flared upper portion 167 of the housing. As noted in connection with the description of FIG. 15, there are provided cutouts 78 and 79 (see also FIG. 8) in the thrust bearing assembly and cutouts 119 and 120 (FIGS. 2 and 15) aligned therewith in annular ring 22 which provide low-pressure fluid passages and hence fluid communication between peripheral scroll pockets 121 and fluid manifold 151. Inlet line 180 (of which there may be more than one) has a slip-on flange 181, with seal groove 182 and bolt holes 183 for connecting inlet line 180 to a source of low-pressure fluid for compression.

As previously noted, compression is accomplished in the scroll apparatus by forcing fluid introduced into the peripheral inlet pockets into fluid pockets, defined by the wraps, which become smaller in volume as the fluid is forced into the central or high-pressure fluid pocket. This is apparent from FIG. 2 which shows the comparative volumes of pockets 121, 122a and 122b, 123a and 123b and central pocket 124. Thus in the compressor of FIG. 1, high-pressure fluid is discharged from central pocket 124 through a central outlet tube 185 which is set in end plate 20 of the stationary scroll member and extends through cover member 169 of the main housing. A fluid passage 186 is cut through end plate 20 to provide fluid communication between central pocket 124 and outlet tube 185; and o-rings 187 and 188 are used to seal outlet tube 185 to end plate 20 and housing cover 169. A high-pressure discharge line 190, with an attached slip-on flange 191, having a seal channel 192 and bolt holes 193, provides the means to connect outlet tube 185 with suitable high-pressure conduit means, not shown.

Figure 17:
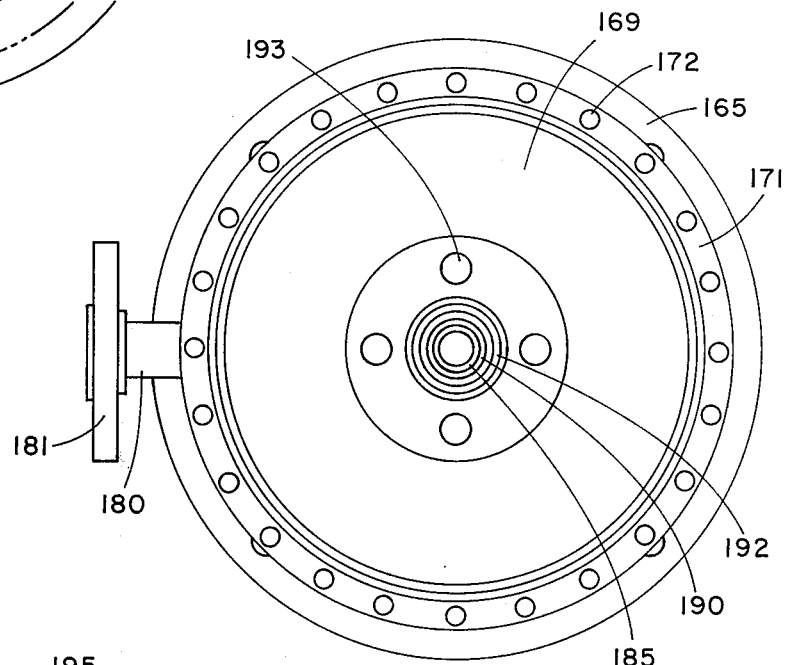
FIG. 17 is a top plan view of the housing of the apparatus of FIG. 1.

FIG. 17 is a top plan view of the apparatus housing showing the location of inlet line 180 and a preferred construction of the housing.

Although the apparatus of this invention is particularly well suited as a compressor for a close-cycle refrigeration system, it may, of course, be used in a number of various other types of systems. It may also be used as an expansion engine, in which case, as will be apparent to those skilled in the art, high-pressure fluid will be introduced into line 190 for transfer to central pocket 124; low-pressure fluid will be withdrawn through line 180 and motor 127 will be replaced by some suitable energy absorbing means.

Figure 18:
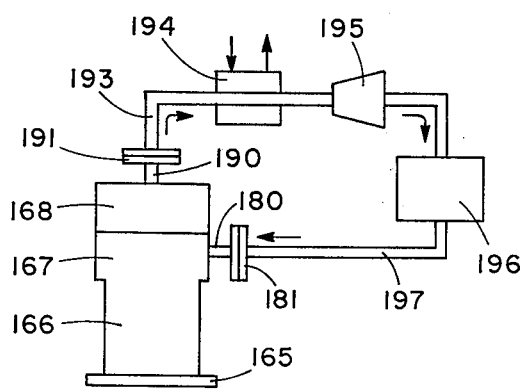
FIG. 18 illustrates, in somewhat diagrammatic form, the incorporation of a compressor constructed in accordance with this invention in a closed cycle refrigeration system.

The use of the apparatus of this invention in a closed-cycle refrigeration system is diagrammed in FIG. 18 wherein like reference numerals are used to identify like components of the compressor shown in FIG. 1. Starting with the discharged high-pressure fluid, which is typically at about 300 psia, it is taken into a heat exchanger 194 to be cooled. This may be an air-cooled heat-exchanger as indicated by the arrows used to indicate fluid flow in, through and out of heat exchanger 194. The high-pressure fluid is then expanded in an adiabatic expander 195 (typically to 80 psia) to cool it and provide refrigeration to a load 196 before being returned via conduit 197 to the inlet 180 of the scroll apparatus.

The scroll apparatus of this invention serving as a compressor is capable of handling large axial forces such as those encountered in a closed cycle refrigeration system. It is, moreover, capable of running over extended periods of time while achieving minimum wear and continuous, efficient, reliable and quiet operation. Finally, it is of a construction for which the manufacturing costs are sufficiently low to make it directly competitive with conventional compressors.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

I claim:

1. A flat plate hydrodynamic thrust bearing with a first contacting surface for use with a journal member having a second contacting surface which is driven to define an orbiting motion, characterized in that one of said contacting surfaces has intersecting groovings for carrying an oil lubricant, the pattern of said groovings being such that when said second surface undergoes said orbiting motion all points on the other of said contacting surfaces intersect a sufficient number of said groovings to ensure that said contacting journal and bearing surfaces are lubricated with a thin, essentially continuous film of said oil lubricant.

2. A thrust bearing in accordance with claim 1 wherein the distance between said intersecting groovings is greater than the orbit radius of said journal member but less than twice said orbit radius.

3. A thrust bearing in accordance with claim 1 wherein said intersecting groovings are in said first contacting surface.

4. A thrust bearing in accordance with claim 1 wherein said intersecting groovings are of an orthogonal pattern.

5. A thrust bearing in accordance with claim 1 wherein said intersecting groovings are of a polar-coordinated pattern.

6. In a positive fluid displacement apparatus into which fluid is introduced through an inlet port for circulation therethrough and subsequently withdrawn through a discharge port, and comprising a stationary scroll member having an end plate and an involute wrap and an orbiting scroll member having an end plate and an involute wrap affixed to the inner surface thereof, driving means for orbiting said orbiting scroll member with respect to said stationary scroll member whereby said involute wraps make moving line contacts to seal off and define at least one moving pocket of variable volume and zones of different fluid pressure on both sides of said moving line contact, coupling means to maintain said scroll members in fixed angular relationship, axial force-applying means for providing an axial force to urge said involute wrap of said stationary scroll member into axial contact with said end plate of said orbiting scroll member and said involute wrap of said orbiting scroll member into axial contact with said end plate of said stationary scroll member thereby to achieve radial sealing of said pockets, and tangential sealing means for effecting tangential sealing along said moving line contacts, the improvement comprising flat plate hydrodynamic thrust bearing means serving as said axial force-applying means, said thrust bearing means having a bearing surface in force-applying engagement with at least a portion of the outer surface of said orbiting scroll member end plate serving as a journal surface, either said bearing surface or said journal surface having intersecting groovings for carrying an oil lubricant, the pattern of said groovings being such that when said orbiting scroll member undergoes motion all points on that surface contacting the surface having said groovings intersect a sufficient number of said groovings to ensure that said bearing and journal surfaces are lubricated with a thin, essentially continuous film of said oil lubricant when said orbiting scroll member is driven by said driving means.

7. A positive fluid displacement apparatus in accordance with claim 6 wherein the distance between said intersecting groovings is greater than the orbit radius of said orbiting scroll member but less than twice said orbit radius.

8. A positive fluid displacement apparatus in accordance with claim 6 wherein said intersecting groovings are in said bearing surface.

9. A positive fluid displacement apparatus in accordance with claim 6 wherein said intersecting groovings are of an orthogonal pattern.

10. A positive fluid displacement apparatus in accordance with claim 6 wherein said intersecting groovings are of a polar-coordinated pattern.

11. A positive fluid displacement apparatus in accordance with claim 6 wherein said thrust bearing means is rigidly affixed to said stationary scroll member and said coupling means is arranged to engage said orbiting scroll member and said stationary scroll member through said thrust bearing means.

12. A positive fluid displacement apparatus, comprising in combination
 a. a stationary scroll member having an end plate and an involute wrap;
 b. an orbiting scroll member having an end plate and an involute wrap affixed to the inner side thereof;
 c. driving means, incorporating a main shaft and an orbiting scroll member shaft parallel therewith, for orbiting said orbiting scroll member whereby said involute wraps make moving line contacts to seal off and define moving pockets of variable volume and zones of different fluic pressure on both sides of said moving line contact, said driving means including radial compliant linking means between said main shaft and said orbiting scroll member shaft to provide a centripetal force to counterbalance a predetermined fraction of the centrifugal force acting upon said orbiting scroll member thereby to attain tangential sealing along said moving line contacts;
 d. high-pressure fluid conduit means communicating with the zone of highest pressure and low-pressure fluid conduit means communicating with the zone of lowest pressure;
 e. coupling means to maintain said scroll members in fixed angular relationship;
 f. flat plate hydrodynamic thrust bearing means acting upon said orbiting scroll member to provide an axial force opposing axial forces within said moving pockets, said thrust bearing means having a bearing surface on its contacting side in force applying contact with a journal surface on the outer side of said end plate of said orbiting scroll member, either said bearing surface or said journal surface having intersecting groovings for carrying a lubricating oil, the pattern of said groovings being such that when said orbiting scroll member undergoes orbiting motion all points on that surface contacting in surface having said groovings intersect a sufficient number of said groovings to ensure that said bearing and journal surfaces are lubricated with a thin, essentially continuous film of said lubricating oil when said orbiting scroll member is driven by said driving means; and
 g. lubricating oil circulating means for supplying lubricating oil to said intersecting groovings.

13. A positive fluid displacement apparatus in accordance with claim 12 wherein the distance between said intersecting groovings is greater than the orbit radius of said orbiting scroll member but less than twice said orbit radius such that any moving point in the contacting of said thrust bearing means and said outer surface of said end plate of said orbiting scroll member intersects at least four of said groovings.

14. A positive fluid displacement apparatus in accordance with claim 12 wherein said intersecting groovings are of an orthogonal pattern.

15. A positive fluid displacement apparatus in accordance with claim 12 wherein said intersecting groovings are of a polar-coordinated pattern.

16. A closed cycle refrigeration system, comprising in combination
 a. a positive fluid displacement apparatus according to claim 12 operating as a compressor;
 b. refrigeration fluid circulating means connecting said high-pressure and said low-pressure conduit means and incorporating therein heat exchange means for cooling compressed fluid carried in said circulating means, adiabatic expansion means for expanding and cooling said compressed fluid and a refrigeration load arranged in heat transfer relationship with the expanded cooled fluid.

17. A positive fluid displacement apparatus in accordance with claim 12 wherein said intersecting groovings are in said bearing surface.

18. A positive fluid displacement apparatus in accordance with claim 17 wherein said thrust bearing means has a shallow annular lubricating oil supply channel in fluid communication with said groovings.

19. A positive fluid displacement apparatus in accordance with claim 12 wherein said thrust bearing means is rigidly affixed to said stationary scroll member through an annular ring and said coupling means is arranged to engage said orbiting scroll member and said stationary scroll member through said thrust bearing.

20. A positive fluid displacement apparatus in accordance with claim 19 wherein said other side of said orbiting scroll member has a first set of two oppositely disposed keyways, said thrust bearing means has a second set of two oppositely disposed keyways on said contacting side displaced 90° from said first set of keyways, and said coupling means comprises an annular ring having on one side two oppositely disposed keys for slidingly engaging said first set of keyways and on the other side two oppositely disposed keys for slidingly engaging said second set of keyways.

21. A positive fluid displacement apparatus in accordance with claim 12 wherein the end of each of said involute wraps facing said end plates is grooved to define a channel and compliance/sealing means are located within said channel, each compliance/sealing means comprising in combination (1) a seal element of the same involute configuration as its associated wrap through which axial contact is effected between said wraps and said end plates, and (2) force applying means for actuating said seal element to effect radial sealing of said moving pockets.

22. A positive fluid displacement apparatus in accordance with claim 21 wherein said force applying means comprises an involutely configured elastomeric member in said channel in axial force applying relationship with said seal element.

23. A positive fluid displacement apparatus in accordance with claim 12 wherein said driving means comprises motor means, the shaft of which is said main shaft, and said radial compliant linking means comprises swing-link means.

24. A positive fluid displacement apparatus in accordance with claim 23 including housing means defining therein an enclosed volume within which said fluid displacement apparatus is mounted, said high-pressure fluid conduit means comprises first tubing means extending through said housing means and said low-pressure fluid conduit means comprises second tubing means opening into said enclosed volume and passage means between said second tubing means and said zone of lowest pressure.

25. A positive fluid displacement apparatus in accordance with claim 24 wherein said housing means defines an oil sump, and said main shaft terminates in an oil cup extending below the level of said oil sump, has two oppositely disposed oil passages drilled therein and is arranged in its rotation to serve as said lubricating oil circulating means.

* * * * *